United States Patent [19]

Bhargava et al.

[11] Patent Number: 5,758,145
[45] Date of Patent: May 26, 1998

[54] METHOD AND APPARATUS FOR GENERATING DYNAMIC AND HYBRID SPARSE INDICES FOR WORKFILES USED IN SQL QUERIES

[75] Inventors: Gautam Bhargava, Cupertino; Paramesh Sampatrai Desai, San Jose; Piyush Goel, Monte Sereno; Peter Hoa, Los Altos; Fen-Ling Lin, San Jose; Balakrishna Raghavendra Iyer, San Jose; Jerry Mukai, San Jose; William Samuel Perlman, San Jose; Hong Sang Tie, Morgan Hill, all of Calif.

[73] Assignee: International Business Machines Corporation, Armonk, N.Y.

[21] Appl. No.: 393,803

[22] Filed: Feb. 24, 1995

[51] Int. Cl.$^6$ .................................. G06F 17/30
[52] U.S. Cl. .............................. 395/602; 395/601
[58] Field of Search ........................ 395/600, 601, 395/602

[56] References Cited

U.S. PATENT DOCUMENTS

| | | | |
|---|---|---|---|
| 4,606,002 | 8/1986 | Waisman et al. | 364/200 |
| 4,817,036 | 3/1989 | Millett et al. | 364/900 |
| 5,197,005 | 3/1993 | Shwartz et al. | 364/419 |
| 5,261,093 | 11/1993 | Asmuth | 395/602 |
| 5,315,709 | 5/1994 | Alston, Jr. et al. | 395/600 |
| 5,369,762 | 11/1994 | Wolf | 395/607 |
| 5,386,556 | 1/1995 | Hedin et al. | 395/600 |
| 5,519,859 | 5/1996 | Grace | 395/600 |
| 5,550,971 | 8/1996 | Brunner et al. | 395/161 |
| 5,560,007 | 9/1996 | Thai | 395/600 |

FOREIGN PATENT DOCUMENTS

WO 92/06440  4/1992  Japan .................. 395/600

OTHER PUBLICATIONS

Alashqur et al. "O–R Gateway: A system for connecting C++ Application Programs and Relational Databases",USENIX C++ technical conference, p.(151–169), Aug. 1992.

Ashany, Ron "Application of sparse matrix techniques to search, retrieval, classification and relationship analysis in large data base system–SPARCOM", Fouth international conference On very large data base, West Berlin, Germany, pp. 4–99–516, Sep. 1978.

Maeker et al., "Dynamic SQL Indexing", *IBM Isclosure Bulletin*, vol. 36, No. 3, Mar. 1993.

*Primary Examiner*—Thomas G. Black
*Assistant Examiner*—Jean M. Corriélus
*Attorney, Agent, or Firm*—Merchant, Gould, Smith, Edell, Welter & Schmidt

[57] ABSTRACT

A method, apparatus and article for manufacture for generating static, dynamic and hybrid sparse indices for use with workfiles used by SQL queries in a relational database management system. A workfile and a sparse index structure are temporarily created in the computer during execution of the query by the computer. The workfile stores intermediate relations resulting from execution of a portion of the SQL query, wherein the intermediate relations comprise sorted rows for an inner table referenced in the SQL query. The sparse index structure contains one or more entries indicating at least an approximate location for at least some of the rows in the workfile. As one or more rows from an outer table referenced in the SQL query are retrieved, the entries of the sparse index structure are searched for a closest matching entry for each retrieved row. The sorted workfile is then scanned for a row matching each retrieved row using the closest matching entry from the sparse index structure as a starting position. The sparse index structure is then updated with an entry corresponding to the row from the sorted workfile matching the retrieved row from the outer table.

15 Claims, 18 Drawing Sheets

METHOD AND APPARATUS FOR GENERATING DYNAMIC AND HYBRID SPARSE INDICES FOR WORKFILES USED IN SQL QUERIES

BACKGROUND OF THE INVENTION

1. Field of the Invention

This invention relates in general to database management systems performed by computers, and in particular to a method and apparatus for generating dynamic and hybrid sparse indices for workfiles used in SQL queries in a relational database management system.

2. Description of Related Art

Relational DataBase Management System (RDBMS) products using a Structured Query Language (SQL) interface are well known in the art. In RDBMS products, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result.

An SQL query often generates workfiles to store temporary result tables while performing the query. Such workfiles are generally created to store intermediate relations from the query. However, there are numerous problems in the use of workfiles. For example, workfiles containing millions of tuples are not uncommon in large databases. As a result, it is important to employ efficient techniques when manipulating workfiles.

One approach may linearly scan workfiles in order to find matching tuples. For every tuple in an outer probing sequence (outer relation), a workfile corresponding to an inner relation is scanned from the beginning (except in a sort-merge join) until a match is found, or until a value greater than the probing value (in a workfile sorted in descending order) is found, or until an end-of-file is encountered. This is an inefficient technique for searching large workfiles, especially when the workfile and outer probing sequence contain a large number of tuples. For example, if there are $n_1$ tuples in the workfile and $n_2$ tuples in the outer probing sequence, then the required number of comparisons is of the order of $n_1 n_2$.

Another approach may employ a bi-directional linear search technique that is similar to the above linear scan except that workfiles are employed only if it is cost beneficial to do so. In the bi-directional linear search technique, the position of the previous probe is used as the starting location for the next search. This position is also used to partition the workfile into two intervals. Depending upon the next value, either of the two partitions are linearly scanned. Although the average number of comparisons in this techniques is equal to half the average number of comparisons in the previous technique, the required number of comparisons in the worst case is still of the order of $n_1 n_2$.

Thus, there is a need in the art for techniques for optimizing the performance of workfiles used in SQL queries.

SUMMARY OF THE INVENTION

To overcome the limitations in the prior art described above, and to overcome other limitations that will become apparent upon reading and understanding the present specification, the present invention discloses a method and apparatus for generating dynamic and hybrid sparse indices for workfiles used in SQL queries in a relational database management system.

A dynamic sparse index is constructed during the search phase of workfile. For every data value of an outer probing sequence, the dynamic sparse index is first probed to determine the starting location of the next search in the workfile. If a key value matching the data value already exists in the dynamic sparse index, then the workfile is not searched and the associated record and record id (RID) is returned from the dynamic sparse index. Otherwise, the dynamic sparse index provides the closest starting location in the workfile for initiating the next scan. If a match is found from the scan of the workfile, then the key value associated with that match is inserted into the dynamic sparse index that is kept in a sorted order. If the dynamic sparse index is full, then a protocol is employed to select a key value to drop from the dynamic sparse index, so that the key value associated with the match can be inserted into the dynamic sparse index, which remains sorted. The protocol ensures that the locality of reference is captured in the dynamic sparse index.

A hybrid sparse index is comprised of two parts: (1) a static part which is never changed and is built during the merge phase of workfile creation, and (2) a dynamic part that is similar to the dynamic sparse index described above and is created during the search phase of workfile access. The static part of the hybrid sparse index consists of a fixed number of key values along with their RIDs in the workfile. Since duplicates are eliminated from the workfile during the merge phase (e.g., for IN subqueries), it is relatively inexpensive to build the static part of the hybrid sparse index during this merge phase. This overhead is incurred only once and reduces the overhead associated with searches. The hybrid sparse index is based on the dynamic sparse index, except that entries in a static portion of the hybrid sparse index never change, while entries in a dynamic portion of the hybrid sparse index are updated in a manner similar to that described above.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
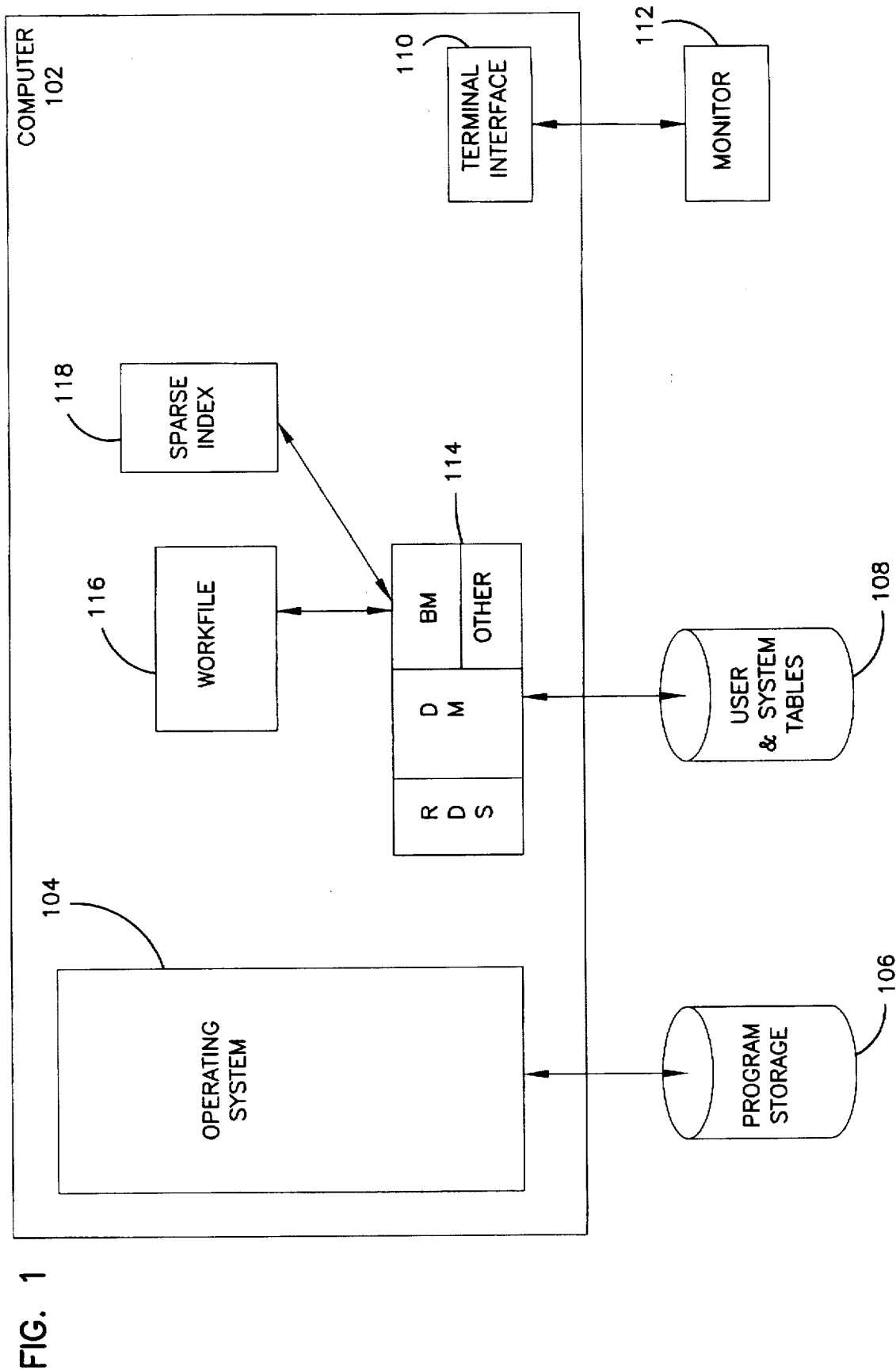
FIG. 1 illustrates an exemplary computer hardware environment that could be used with the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The present invention comprises a set of efficient computer-implemented techniques for constructing and using dynamic and hybrid sparse indices for workfiles in SQL queries. The present invention is particularly useful in enhancing the performance of non-correlated subqueries with IN and/or NOT IN subqueries.

For example, consider the SQL query:
SELECT *
FROM T1, T2
WHERE
T1.C1=T2.C1 AND
T1.C2 IN (SELECT T3.C2 FROM T3)

For such queries, the RDBMS product creates a sorted, duplicate-free workfile for the inner query block "SELECT T3.C2 FROM T3". A value from the outer query block "SELECT * . . . " is used to scan the workfile until a match is found (or an end-of-file is reached). The present invention proposes to improve the performance of this search method using sparse indices for the workfile.

Since the workfile is sorted and duplicate-free, for the class of queries under consideration, the present invention uses the sparse index to logically partition the workfile into a number of search regions. Then, given a probing value from the outer probing sequence, the present invention no longer has to start each probe or search from the beginning of the workfile. Rather, the present invention uses the sparse index to find a better starting position in the workfile. Thus, by reducing the interval of searches in the workfile, the present invention obtains a corresponding improvement in query execution time.

A traditional index provides a "pointer" to every data record based on some "key" information. Thus, an index provides a mechanism to perform quick searches for a given data value. However, this requires building a complete index on workfiles. Since index construction is computationally expensive, it may result in a potential regression in performance. Unlike a traditional index, no separate data scan is required by the techniques of the present invention.

A sparse index according to the present invention only provides an approximate location of a data record based on some "key" information. Within this approximate region, the exact location of the data record is determined using an auxiliary search method, e.g., a sequential scan. Each entry in the sparse index contains a key value and a record id (RID). The RID provides the location of the record matching the corresponding key value in the workfile. Those skilled in the art will recognize that the entry in the sparse index could contain the entire record from the workfile, and not just the RID, and thus avoid an I/O operation for a direct hit.

In addition to reducing the time spent on retrieving information from workfiles, the present invention also minimizes the overhead cost associated with the creation of sparse indices. In a first embodiment using a dynamic sparse index, the overhead of generating the index is minimized by amortizing the cost over the search phase when the workfile is scanned for an outer probing sequence. In a second embodiment using a hybrid sparse index, the overhead is minimized by amortizing the cost during the merge phase of workfile creation as well as during the search phase of workfile access. Consequently, the cost of building the sparse index is minuscule. Both embodiments attempt to reduce the possibility of any regression in the performance of existing query plans. Further, unlike an index in which pointers to the data are wholly static, the sparse indices of the present invention also adapt to the locality of reference implied by the probing sequence and collect information about "hot spots" as explained in more detail herein later.

ENVIRONMENT

FIG. 1 illustrates an exemplary computer hardware environment that could be used with the present invention. In the exemplary environment, a computer system 102 is comprised of one or more processors operating under the control of an operating system 104 and connected to one or more electronic storage devices 106 and 108, such as fixed or removable disks or CD-ROMs or tape drives or other devices, that store operating system software, application software, databases, user tables, system tables, log files, etc.

Operators of the computer system 102 use a standard terminal interface 110, such as IMS/DB/DC, CICS, TSO, or other interface, to transmit electrical signals between the computer system 102 and a monitor 112, wherein the signals represent commands to perform various search and retrieval functions, termed queries, against the databases, typically using Relational DataBase Management System (RDBMS) software 114 that incorporates the Structured Query Language (SQL) standard. In the preferred embodiment of the present invention, the RDBMS software 114 comprises the DB2 product offered by IBM for the MVS, AIX, or OS/2 operating systems. Those skilled in the art will recognize, however, that the present invention has application to any RDBMS software 114.

In performing an SQL query, a workfile 116 (or temporary result table) is often created in the computer 102 by the RDBMS software 114 to store intermediate relations from the query. In accordance with the teachings of the present invention, a sparse index 118 is also created by the RDBMS software 114 in the computer 102 to optimize access to the workfile 116.

In the present invention, the sparse index 118 for the workfile 116 is created in a main memory of the computer 102 in order to reduce the cost of search and creation. A fixed amount of storage is acquired for each sparse index 118. Depending on the key size, this storage is then allocated to as many index entries as can fit therein.

For example, assume that the header of the sparse index 118 data structure is b bytes long, each key is k bytes long, each RID is r bytes long, and the sparse index 118 is stored in a 32 kb block in memory. In such a situation, the maximum number of possible entries is:

$$\lfloor \frac{(32k-b)}{(k+r)} \rfloor$$

wherein $\lfloor$ and $\rfloor$ together represent a FLOOR function.

Preferably, fixed-sized sparse indices 118 are constructed so that they can be implemented via arrays, rather than the traditional B+tree data structure, although B+tree structures could also be used. By avoiding B+tree data structures, the present invention eliminates the cost associated with the splitting of interior nodes in the B+tree data structure. This reduces the overhead of creating the sparse indices 118.

DYNAMIC SPARSE INDEX

Figure 2:
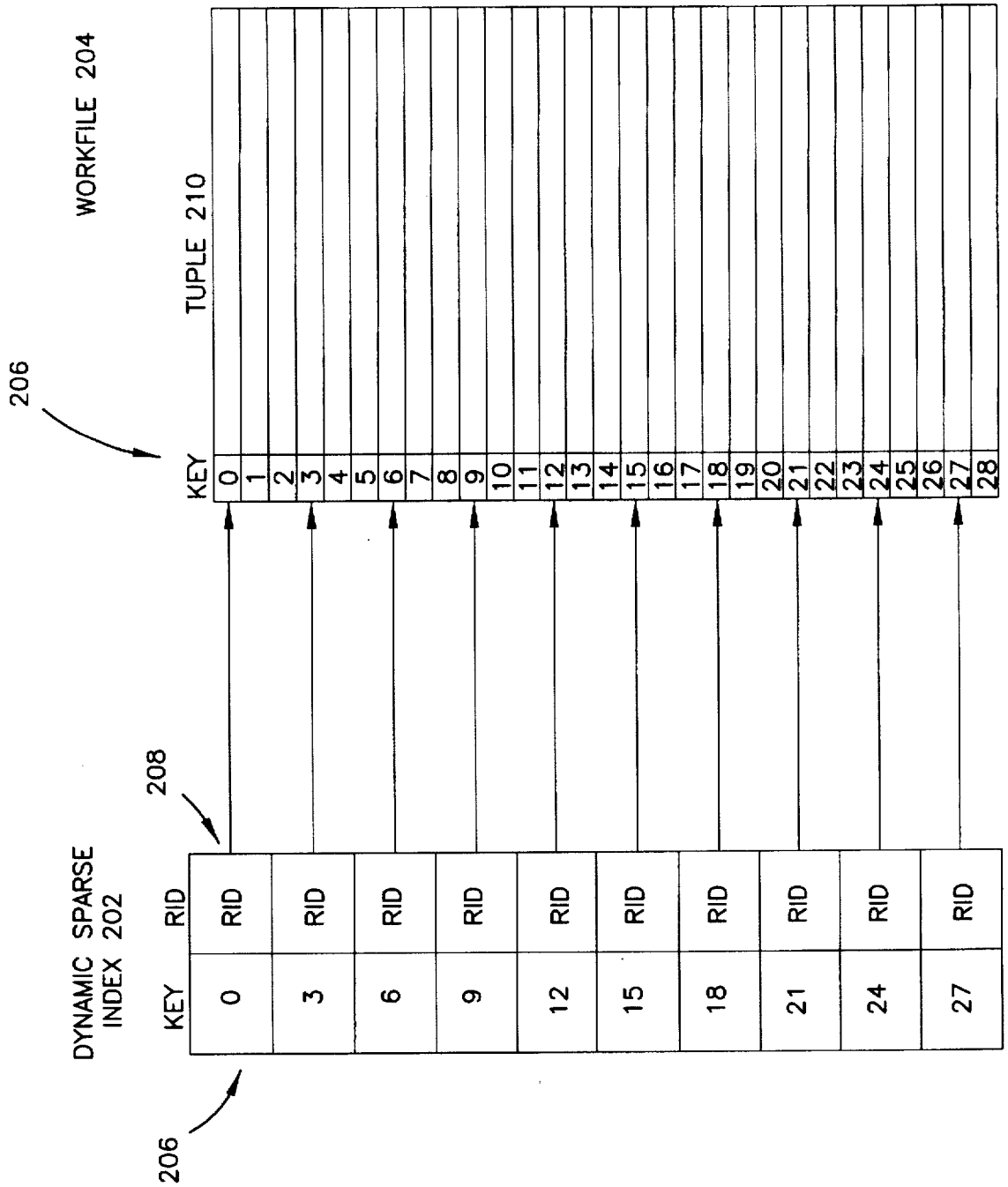
FIG. 2 is a block diagram illustrating the use of a dynamic sparse index with a workfile according to the present invention.

FIG. 2 is a block diagram illustrating the use of a dynamic sparse index 202 with a workfile 204 according to the present invention. The dynamic sparse index 202 is constructed in the memory of the computer by the RDBMS software during the search phase. The key values 206 in the dynamic sparse index 202 are always kept in sorted order. Without any loss of generality, the present invention assumes that key values 206 in the dynamic sparse index 202 and workfile 204 are in the ascending order. However, those skilled in the art will recognize that the present invention would also apply when the key values 206 are in descending order.

For every data value of the outer probing sequence, the sparse index 202 is first probed using a binary search in order to determine the starting location of the next search in the workfile 204. If a key value 206 matching the data value already exists in the sparse index 202, then the workfile 204 is not searched and the RID 208 is returned from the sparse index 202. Otherwise, the starting location from the dynamic sparse index 202 is used to initiate the next search in the workfile 204, e.g., using a sequential scan starting from the RID 208 associated with the closest key value 206.

If a match is found from the scan of the workfile 204, then the key value 206 from the tuple 210 associated with that match is inserted into the dynamic sparse index 202. In this embodiment of the present invention, the first n matching unique key values 206 from the outer probing sequence are inserted into the dynamic sparse index 202, where n is the maximum number of keys that would fit in the dynamic sparse index 202.

If the dynamic sparse index 202 is full, then one of key values 206 is dropped from the dynamic sparse index 202. In the first embodiment, the end key value which is farthest away from last key value 206 retrieved from the workfile 204 may be chosen to be dropped from the dynamic sparse index 202.

By replacing the farthest away end key value 206, the first embodiment attempts to keep information about the region in the workfile 204 that is more frequently referenced. Also, the location of the previous probe in the dynamic sparse index 202 is also used to speed up the search process. These factors combined together enable the first embodiment to capture the locality of reference in the dynamic sparse index 202 and the workfile 204.

Of course, other techniques could also be used to update the dynamic sparse index 202. For example, instead of dropping one of the two end key values 206, a least recently used key value 206 can be dropped from the dynamic sparse index 202. However, this requires that key values 206 be sorted according to their values as well as their past usage, or tagged with a timestamp, or otherwise identified for such purposes.

CREATING AND ACCESSING A DYNAMIC SPARSE INDEX

FIGS. 3A–3I together are a flowchart illustrating in detail the logic used by the RDEMS software in creating and accessing a dynamic sparse index according to the first embodiment of the present invention.

In the logic of FIGS. 3A–3I, the following variables and procedures are used:

(a) the array "sparse-index" is used to indicate the dynamic sparse index having entries 1 to n, wherein the entries are comprised of keys and record ids (RIDs);

(b) the variable "count" is the number of entries with data in the sparse-index;

(c) the variable "val" is a current data value from a probe sequence S;

(d) the variable "$val_{prev}$" is a previous data value from a probe sequence S;

(e) the variable "$last_{loc}$" is an index of the entry in sparse-index that provided the starting location of the previous search;

(f) the procedure "binary-search(first, last, $start_{rid}$, index)" is a procedure for binary searching the sparse-index between locations first and last, wherein $start_{rid}$ returns the starting location in the workfile and index returns the corresponding index in sparse-index;

(g) the procedure "sort-insert($end_{val}$, val, index)" is a procedure that inserts val and its RID into the location indicated by index in the sparse-index such that sparse-index remains sorted, wherein $end_{val}$ indicates a position in the sparse-index such that if $end_{val}$=1 ($end_{val}$=count) then the first (last) value is dropped in sparse-index.

Figure 3A:
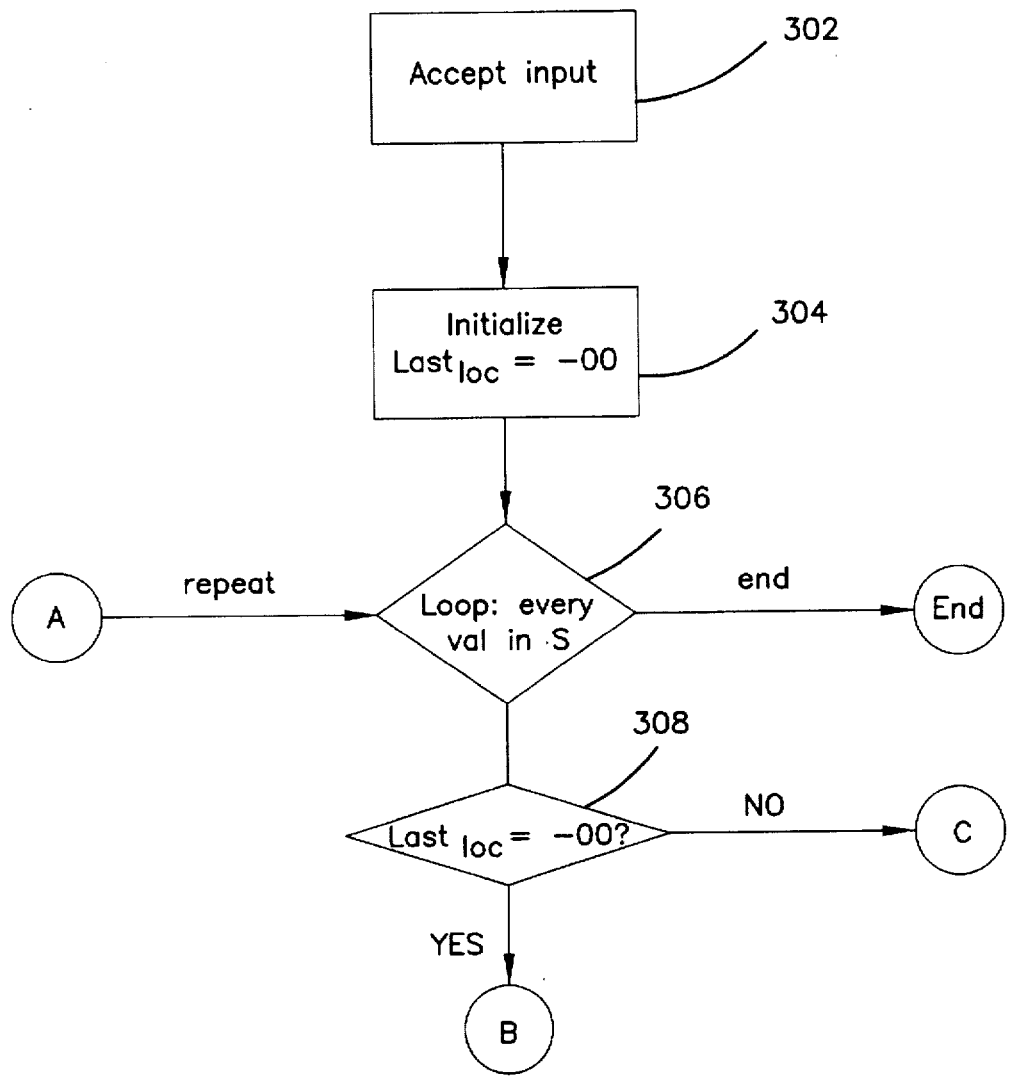
FIGS. 3A–3I together are a flowchart illustrating in detail the logic used by the RDBMS software in creating and probing a dynamic sparse index according to the first embodiment of the present invention.

Referring initially to FIG. 3A, block 302 represents accepting inputs into the procedure, which inputs comprise a probing sequence S, a workfile W and a sparse-index. Block 304 represents the initialization of $last_{loc}$ to the value $-\infty$. Block 306 is a loop that is executed for every val in S, wherein block 308 is the first block of the loop and the logic terminates at "end" when the loop terminates after the last val in S. Block 308 is a decision block that determines whether $last_{loc}$=$-\infty$. If so, control transfers to "B" in FIG. 3B; otherwise, control transfers to "C" in FIG. 3C.

Figure 3B:
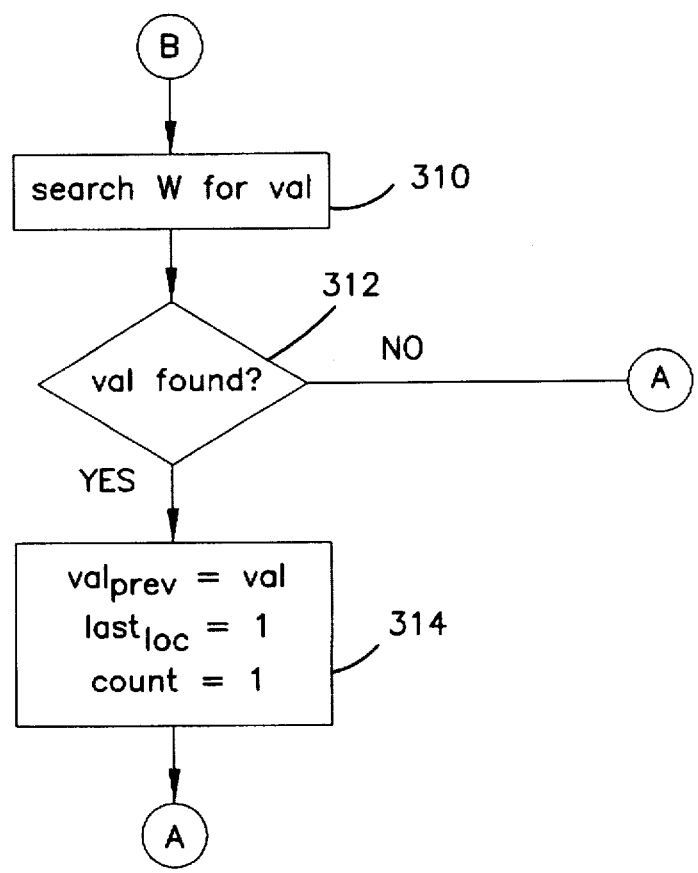

Referring now to FIG. 3B, block 310 represents a search of the workfile W for val. Block 312 is a decision block that determines if val was found in the search. If not, control transfers to "A" in FIG. 3A; otherwise, control is transferred to block 314. Block 314 sets $val_{prev}$=val, $last_{loc}$=1, and count=1. Control then transfers to "A" in FIG. 3A.

Figure 3C:
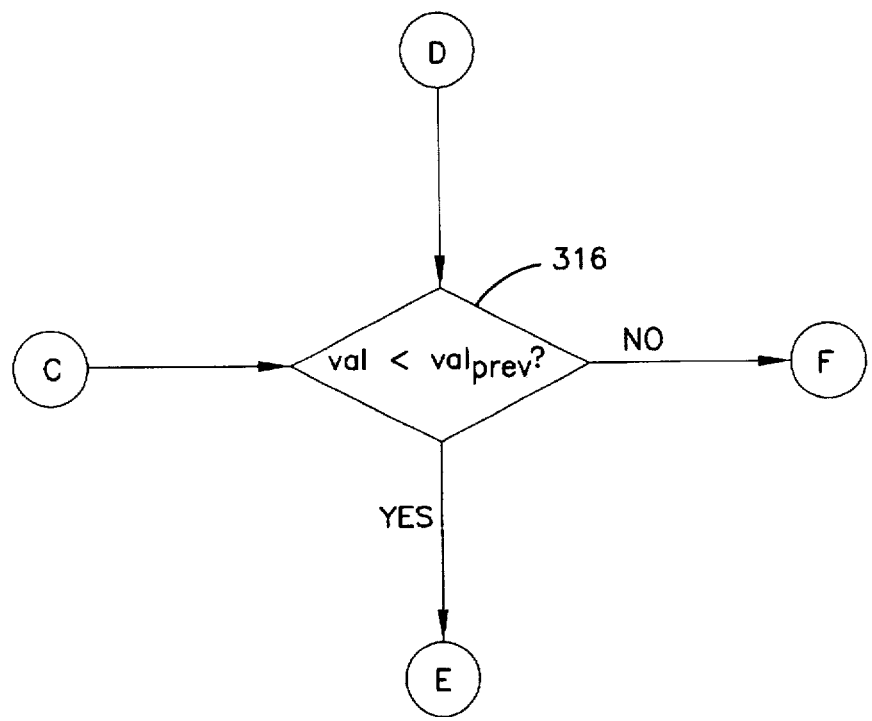

Referring now to FIG. 3C, block 31G is a decision block that determines whether val<$val_{prev}$. If so, control transfers to "E" in FIG. 3D; otherwise control transfers to "F" in FIG. 3E.

Figure 3D:
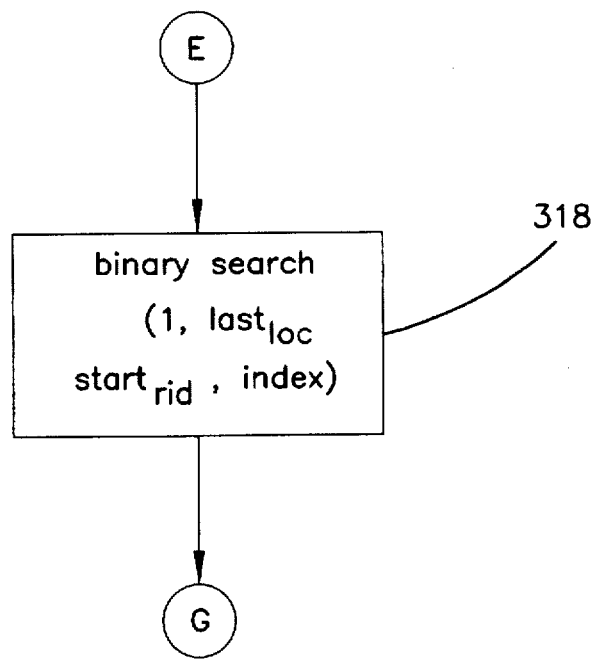

Referring now to FIG. 3D, block 318 represents the invocation of the procedure "binary-search(1, $last_{loc}$, $start_{rid}$, index)" to search through the sparse-index beginning from the first entry. Control then transfers to "G" in FIG. 3E.

Figure 3E:
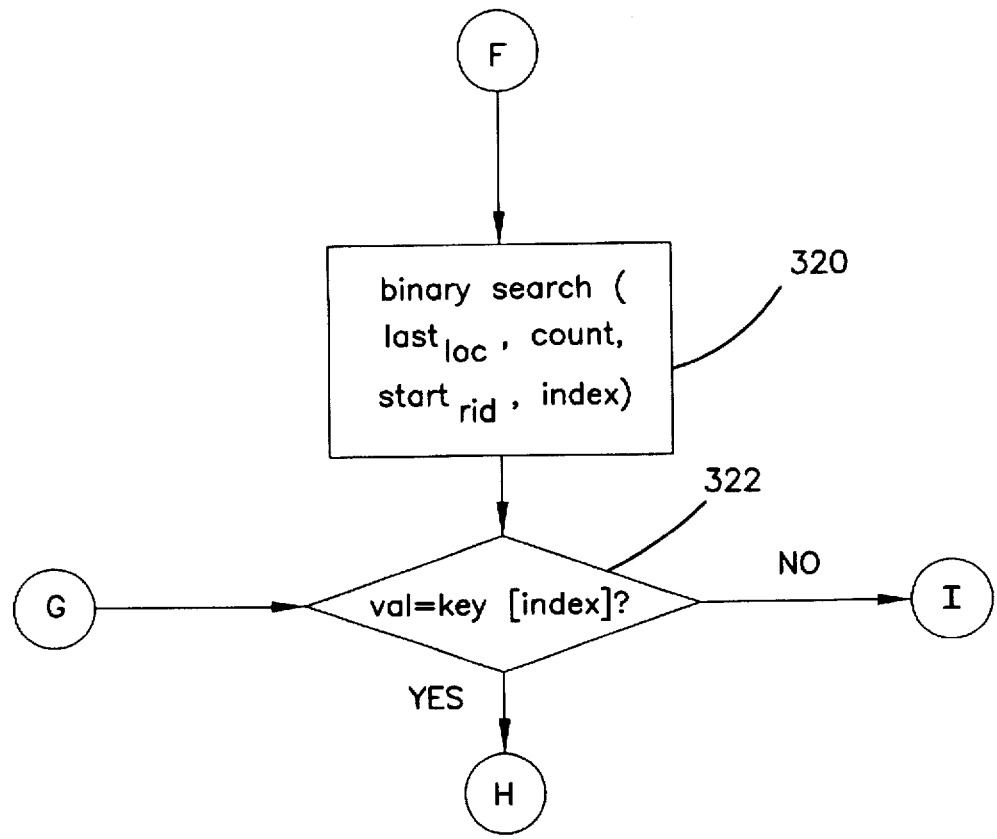

Referring now to FIG. 3E, block 320 represents the invocation of the procedure "binary-search($last_{loc}$, count, $start_{rid}$, index)" to search the sparse-index from the last position used. Block 322 is a decision block that determines whether val=key[index] of the sparse-index. If so, then a match has been found for val, and control transfers to "H" in FIG. 3I; otherwise, control transfers to "I" in FIG. 3F.

Figure 3F:
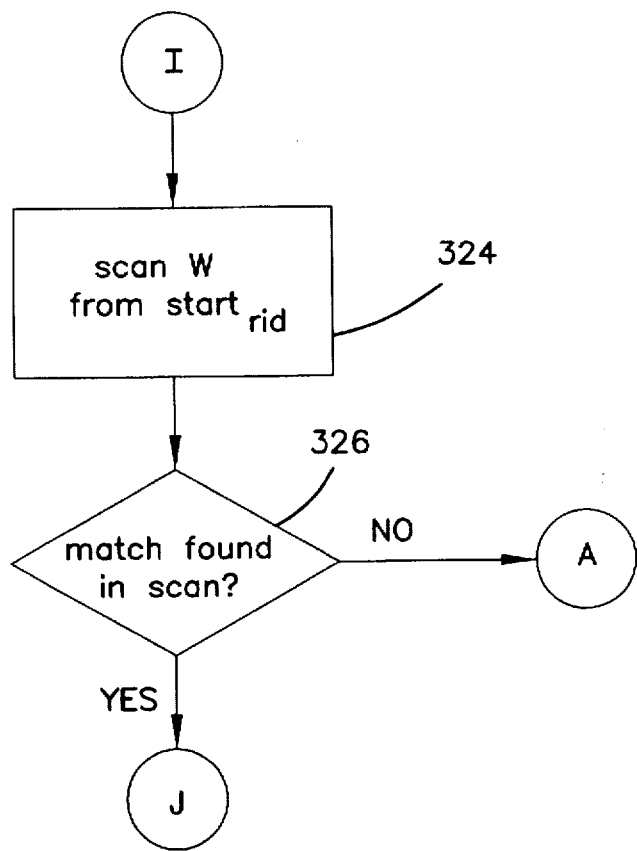

Referring now to FIG. 3F, block 324 represents a scan of the workfile starting at the location $start_{rid}$. Block 326 is a decision block that determines whether a match is found in the workfile. If so, control transfers to "J" in FIG. 3G; otherwise, control transfers to "A" in FIG. 3A to complete the loop.

Figure 3G:
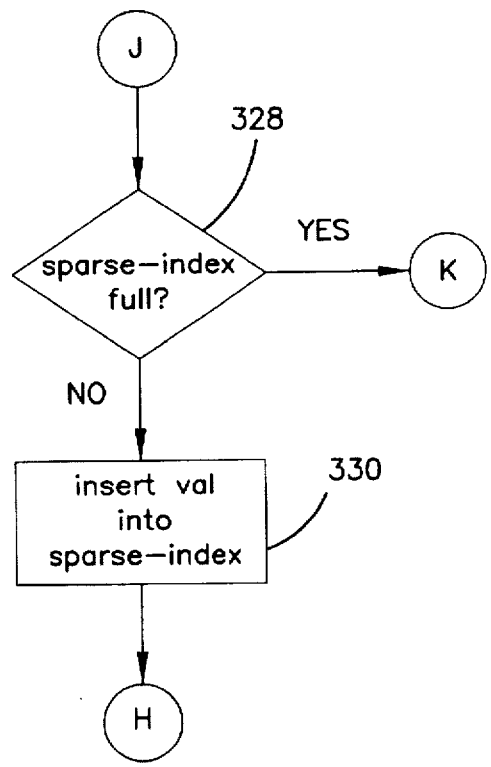

Referring now to FIG. 3G, block 328 is a decision block that determines whether the sparse-index is full. If so, control transfers to "K" in FIG. 3H; otherwise, control transfers to block 330. Block 330 represents the insertion of val into the sparse-index such that the sparse-index remains sorted. Control then transfers to "H" in FIG. 3I.

Figure 3H:
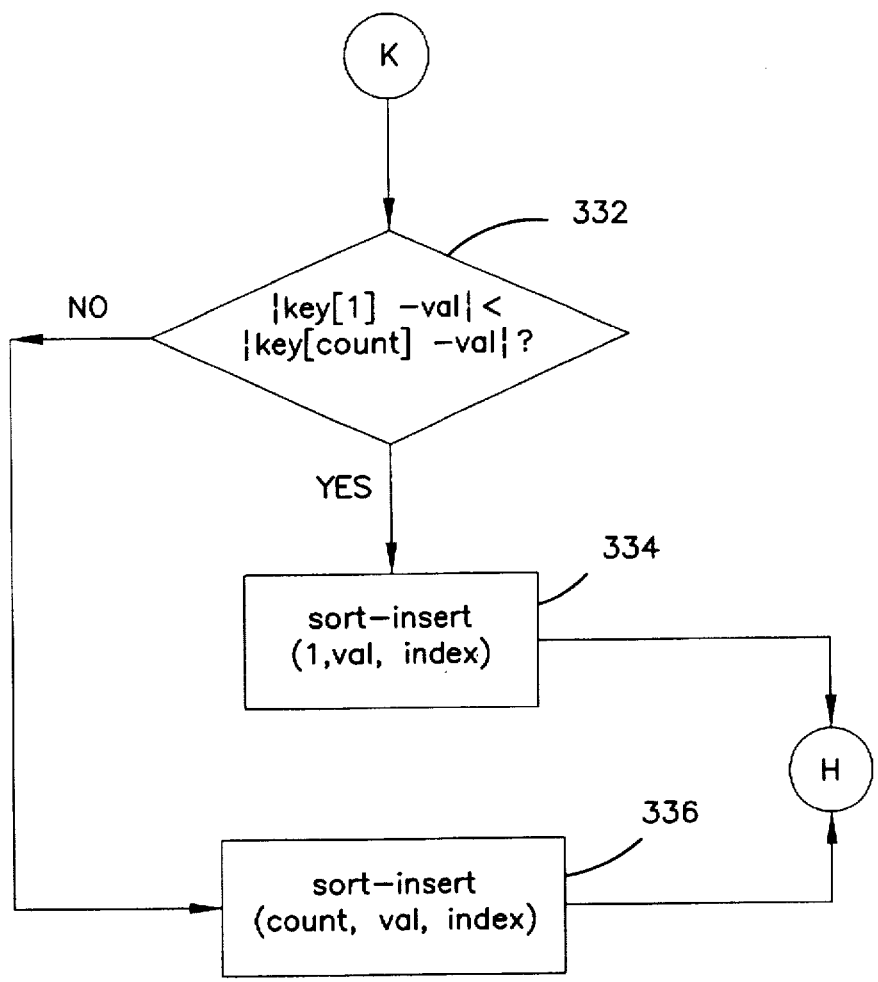

Referring now to FIG. 3H, block 332 is a decision block that determines whether the absolute value of key[1]−val from the sparse-index is less than the absolute value of key[count]−val from the sparse index. If so, control transfers to block 334; otherwise, control transfers to block 338. Block 334 represents the invocation of the procedure "sort-insert(1, val, index)", which inserts val into the full sparse index by first deleting the first entry of the sparse-index.

Block 336 represents the invocation of the procedure "sort-insert(count, val, index)", which inserts val into the full sparse-index by first deleting the last entry of the sparse-index. In both cases, control then transfers to "H" in FIG. 3I.

Figure 3I:
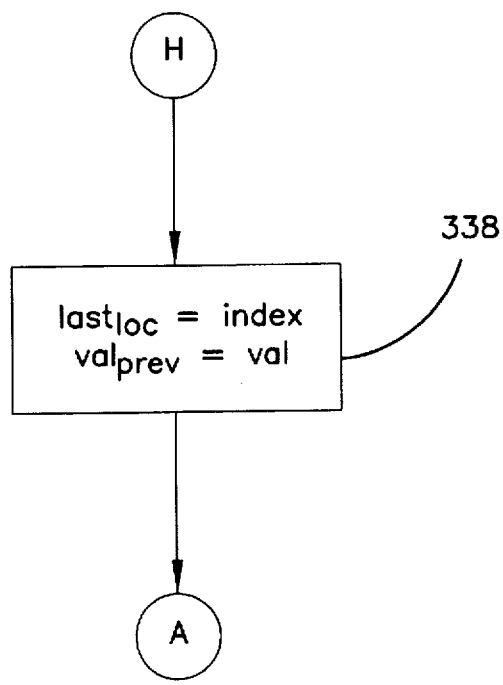

Referring now to FIG. 3I, block 338 represents setting $last_{loc}$=index and setting $val_{prev}$=val. Control then transfers to "A" in FIG. 3A to complete the loop.

HYBRID SPARSE INDEX

The dynamic sparse index of the first embodiment has three limitations. First, if the outer probing sequence is sorted in the reverse order of the workfile, then the entries in the dynamic sparse index do not provide any information about the starting location in the workfile. Second, due to its dynamic nature, the first embodiment cannot guarantee any improvement in performance. Finally, the overhead of maintaining and manipulating the sorted dynamic sparse index with every data value from the outer probing sequence can become excessive.

The present invention proposes a second embodiment to remedy these shortcomings. The second embodiment partitions the sparse index into two parts: (1) a static part which is never changed and is built during the creation of the sorted workfile (i.e., during the merge phase of workfile creation), and (2) a dynamic part that is similar to the dynamic sparse index described above in the first embodiment and is created during the search.

Figure 4:
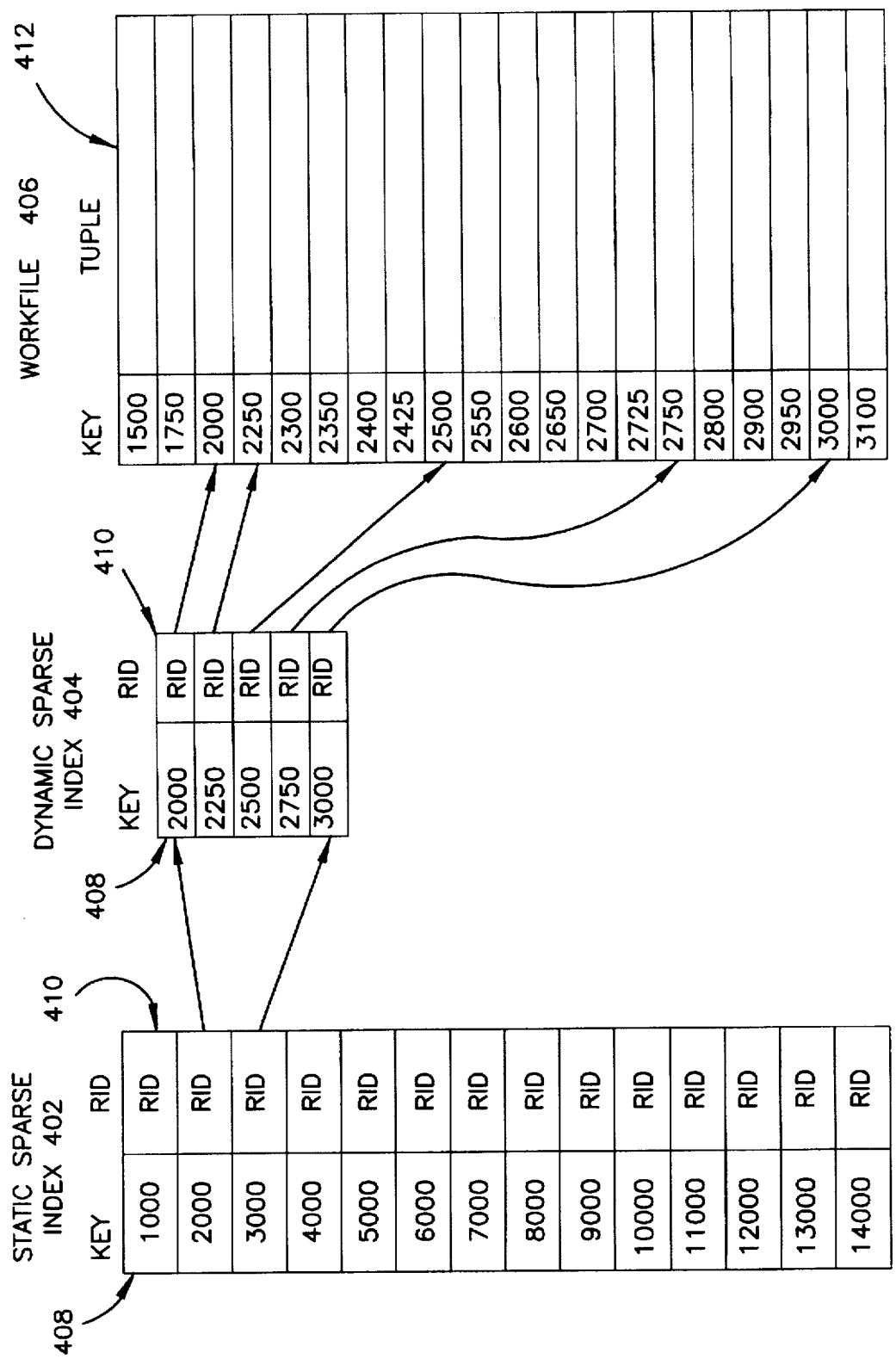
FIG. 4 is a block diagram illustrating a hybrid sparse index comprised of a static portion and a dynamic portion according to the present invention.

FIG. 4 is a block diagram illustrating a hybrid sparse index comprised of a static portion 402 and a dynamic portion 404 that is used to access a workfile 406 according to the present invention. The static part 402 of this hybrid sparse index consists of $n_{static}$ number of key values 408 along with their RIDs 410 in the workfile 40G. Note that since duplicates are eliminated from the workfile 406 during the merge phase (e.g., for IN subqueries), it is relatively inexpensive to build the static portion 402 of the hybrid sparse index during the merge phase. Also, this overhead is incurred only once and therefore reduces the overhead associated with searches. During the merge phase, when tuples 412 are inserted into a workfile 406, every $i^{th}$ tuple 412 that is inserted into the workfile 406 is also inserted into the static portion 402 of the hybrid sparse index, where i is the skip factor and is equal to $\lfloor(\#tuples/n_{static})\rfloor$, and "#tuples" is the total number of tuples 412 sorted during the sort phase.

The dynamic portion 404 of the hybrid sparse index consists of $n_{dynamic}$ number of key values 408 along with their RIDs 410 in the workfile 406. Note that the total number of maximum key values 408 in the hybrid sparse index is $n=n_{static}+n_{dynamic}$. The static portion 402 and dynamic portion 404 of the hybrid sparse index are kept separate and individually sorted, wherein the dynamic portion 404 contains entries for an interval corresponding to two consecutive key values 408 in the static portion 402. These two consecutive key values 408 are sorted as the first and the last entries, respectively, in the dynamic portion 404.

The second embodiment is very similar to the first embodiment except that entries in the static portion 402 of the hybrid sparse index never change. For every data value of the outer sequence, the dynamic portion 404 of the hybrid sparse index is first searched via a binary search in order to determine the starting location in the workfile 406. If the data value is greater than the first key value 408 and less than the last key value 408 in the dynamic portion 404, then the dynamic portion 404 of the hybrid sparse index provides the starting location in the workfile 406.

However, if the data value is less than the first key value 408 or is greater than the last key value 408 in the dynamic portion 404 of the hybrid sparse index, then the dynamic portion 404 does not provide the starting location. In this case, the static portion 404 of the hybrid sparse index is searched next.

The first and the last entries in the dynamic portion 404 are initialized according to the match found in the static portion 402, and the number of key values 408 in the dynamic portion 402 is initialized to 2. The key value in the static portion 402 of the hybrid sparse index, which provides the starting location, is assigned to the first entry in the dynamic portion 404, and the key value 408 next to this key value in the static portion 402 of the sparse index is assigned to the last entry in the dynamic portion 404. These end entries in the dynamic portion 404 are never replaced; the entries next to these two entries are considered the end key values 408 for insertion purposes and are replaced during the search of the dynamic portion 404. The method employed to search and update the dynamic portion is similar to the method of FIGS. 3A–3I employed in the first embodiment, except that the entries in the static portion 402 of the sparse index are never deleted.

The cost of building the static portion 402 and dynamic portion 404 of the hybrid sparse index is amortized over the merge and search phase. Locations of the previous probes in the static portion 402 and dynamic portion 404 are used in the next search in order to speed up the searches. Similar to the dynamic sparse index, the dynamic portion 404 of the hybrid sparse index is changed according to the probing sequence. These factors combined together enable us to capture the locality of the reference.

CREATING A STATIC PORTION OF A HYBRID SPARSE INDEX

Figure 5:
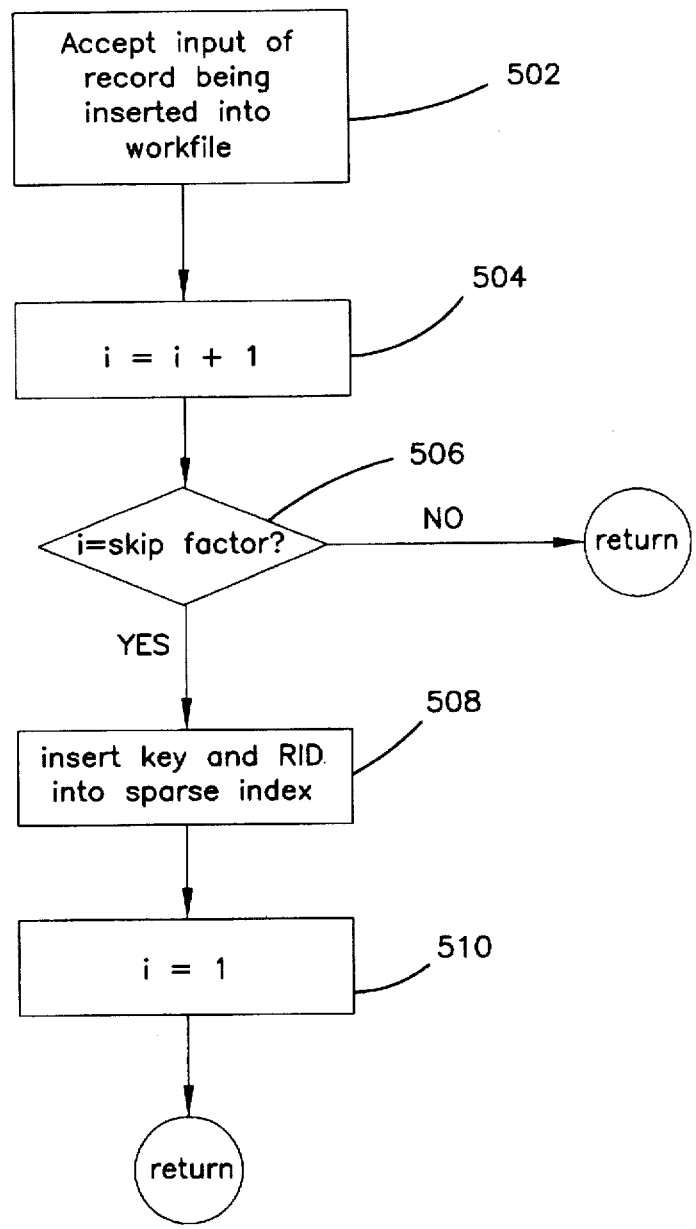
FIG. 5 is a flowchart further illustrating the logic used in creating the static portion of a hybrid sparse index according to the present invention.

FIG. 5 is a flowchart further illustrating the logic used in creating the static portion of a hybrid sparse index according to the present invention.

Block 502 represents accepting input, in this case the next record being inserted into the workfile during the merge phase of workfile creation. Block 504 represents the incrementing of the counter i=i+1. Block 506 is a decision block that determines whether the counter i has been incremented to match the skip factor. If not, control returns to the calling procedure; otherwise, control transfers to block 508. Block 508 is a decision block that inserts the key value and RID associated with the current record into the static portion of the sparse index, into the first entry of the associated dynamic portion of the sparse index, and into the last entry of the previous dynamic portion of the sparse index (if there is one). Block 510 represents the counter i being reset to 1.

CREATING A DYNAMIC PORTION OF A HYBRID SPARSE INDEX

FIGS. 6A–6E together are a flowchart illustrating the logic used in creating and accessing the dynamic portion of a hybrid sparse index according to the present invention.

In the logic of FIGS. 6A–6E, the following variables and procedures are used:

(a) the array "Static" is used to indicate the static portion of the sparse index having entries 1 to $n_{static}$, wherein the entries are comprised of keys and record ids (RIDs);

(b) the variable "SCNT" is the current number of entries in the Static portion;

(c) the array "Dynamic" is used to indicate a dynamic portion of the sparse index having entries 1 to $n_{dyamic}$, wherein the entries are comprised of keys and record ids (RIDs);

(d) the variable "DCNT" is the current number of entries in the Dynamic portion;

(e) the variable "val" is a current data value from a probe sequence S;

(f) the variable "$val_{prev}$" is a previous data value from a probe sequence S;

(e) the procedure "binary-search(portion, first, last, $start_{rid}$, index)" is a procedure for binary searching either the static or dynamic portion of the sparse-index between the locations first and last, wherein portion is "Static" or "Dynamic", $start_{rid}$ returns the starting location in the workfile, and index returns the corresponding index in the searched portion;

(f) the procedure "sort-insert(Dynamic, $end_{val}$, val, index)" is a procedure that inserts val and its RID into the dynamic portion of the sparse index at the location indicated by index such that the dynamic portion remains sorted, wherein $end_{val}$ indicates an entry in the dynamic portion to delete when inserting a new key value.

Figure 6A:
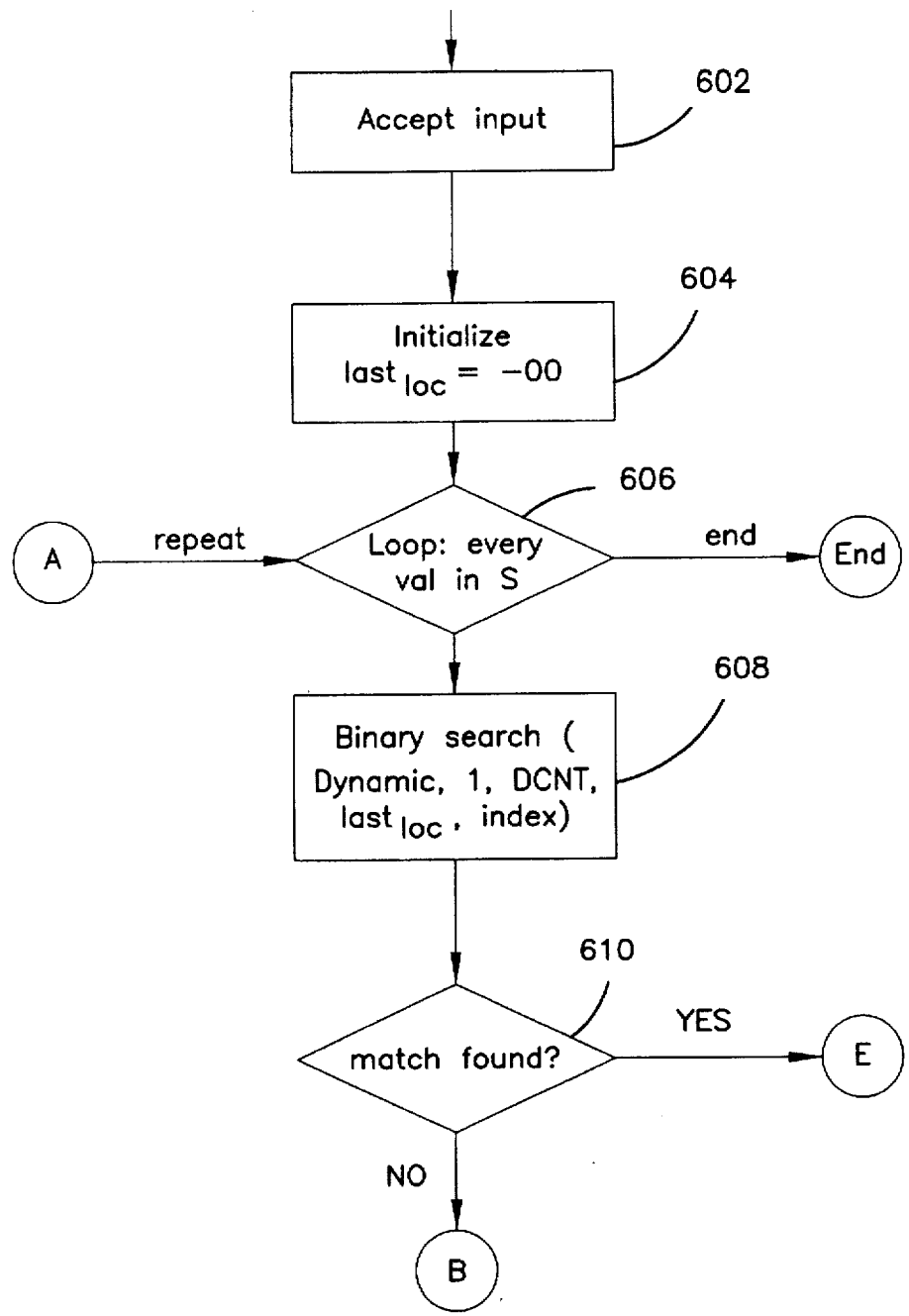
FIGS. 6A–6E together are a flowchart illustrating the logic used in creating and accessing the dynamic portion of a hybrid sparse index according to the present invention.

Referring initially to FIG. 6A, block 602 represents accepting inputs into the procedure, which inputs comprise a probing sequence S, a workfile W, and a hybrid sparse index. Block 604 represents the initialization of $last_{loc}$ to the value $-\infty$. Block 606 is a loop that is executed for every val in S, wherein block 608 is the first block of the loop and the logic terminates at "end" when the loop terminates after the last val in S. Block 608 represents the invocation of the procedure "binary-search(Dynamic, 1, DCNT, $last_{loc}$, index)" to search through the dynamic portion of the hybrid sparse index beginning from the first entry. Block 610 is a decision block that determines whether a match was found for val in the binary search of the dynamic portion of the hybrid sparse index. If so, control transfers to "E" in FIG. 6E; otherwise, control transfers to "B" in FIG. 6B.

Figure 6B:
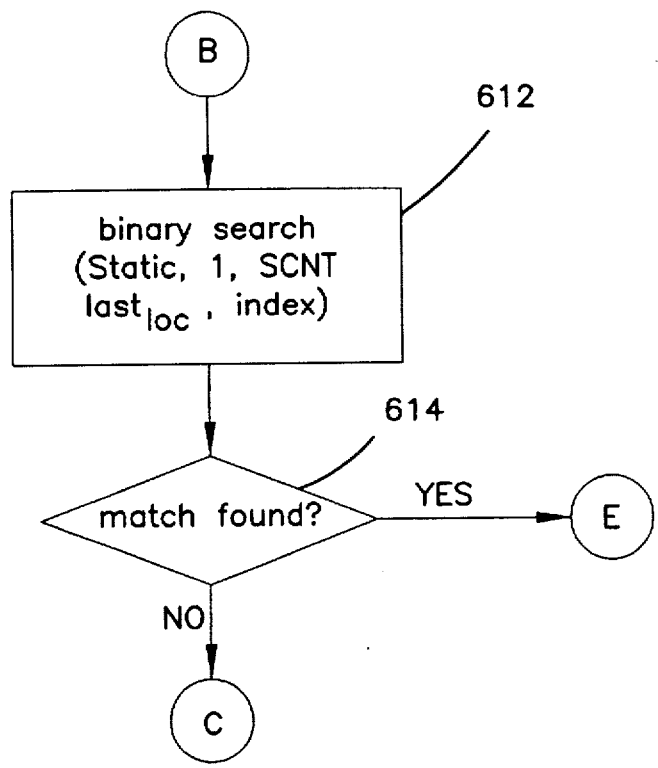

Referring now to FIG. 6B, block 612 represents the invocation of the procedure "binary-search(Static, 1, SCNT, $last_{loc}$, index)" to search through the static portion of the hybrid sparse index. Block 614 is a decision block that determines whether a match was found for val in the binary search of the static portion of the hybrid sparse index. If so, control transfers to "E" in FIG. 6E; otherwise, control transfers to "C" in FIG. 6C.

Figure 6C:
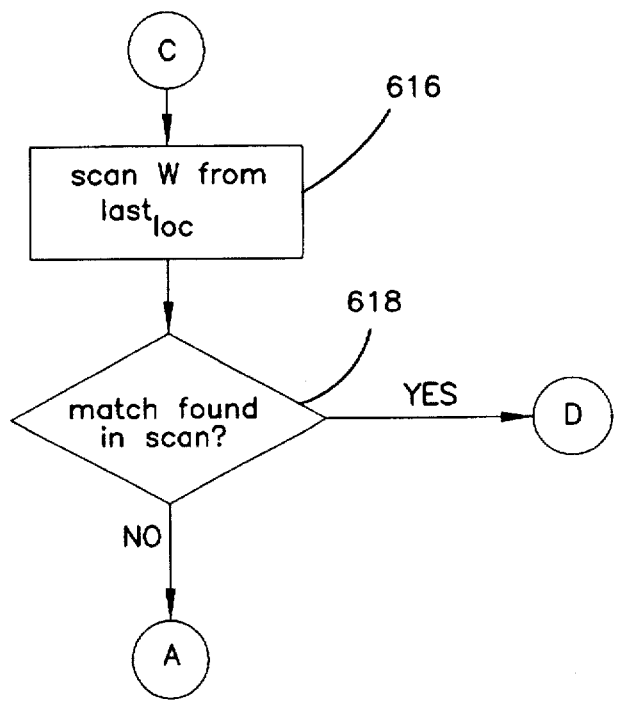

Referring now to FIG. 6C, block 616 represents a scan of the workfile starting at the location determined from the dynamic or static index ($last_{loc}$). Block 618 is a decision block that determines whether a match is found in the workfile. If so, control transfers to "D" in FIG. 6D; otherwise, control transfers to "A" in FIG. 6A.

Figure 6D:
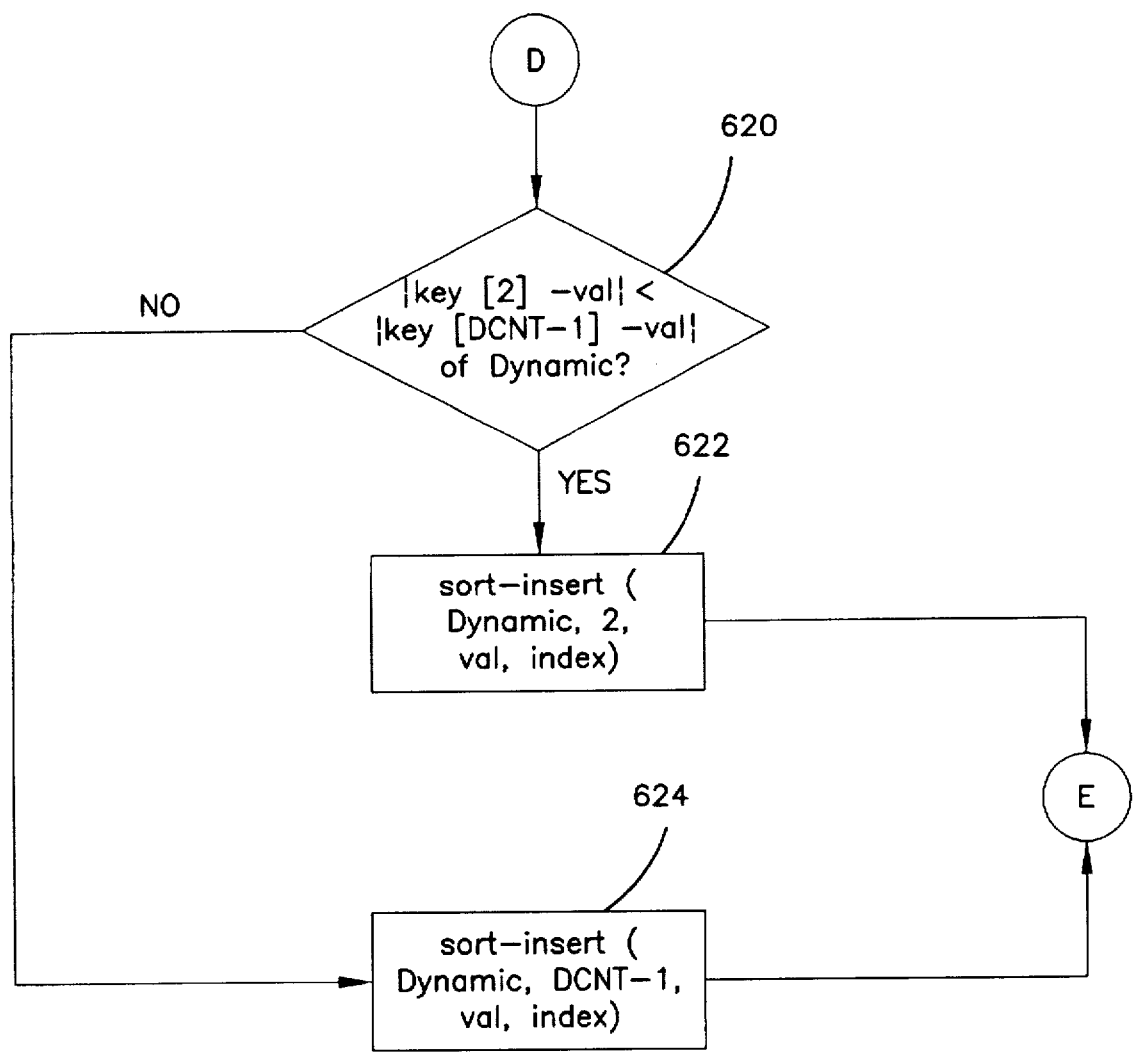

Referring now to FIG. 6D, block 620 is a decision block that determines whether the absolute value of key[2]-val from dynamic portion of the hybrid sparse index is less than the absolute value of key[DCNT-1]-val from the dynamic portion of the hybrid sparse index. If so, control transfers to block 622; otherwise, control transfers to block 624. Block 622 represents the invocation of the procedure "sort-insert (Dynamic, 2, val, index)", which inserts val into the dynamic portion of the sparse index, possibly by first deleting the second entry of the dynamic portion if the dynamic portion is full. Block 624 represents the invocation of the procedure "sort-insert(Dynamic, DCNT-1, val, index)", which inserts val into the dynamic portion of the hybrid sparse index, possibly by first deleting the next-to-the-last entry of the dynamic portion if the dynamic portion is full. In both cases, control then transfers to "E" in FIG. 6E.

Figure 6E:
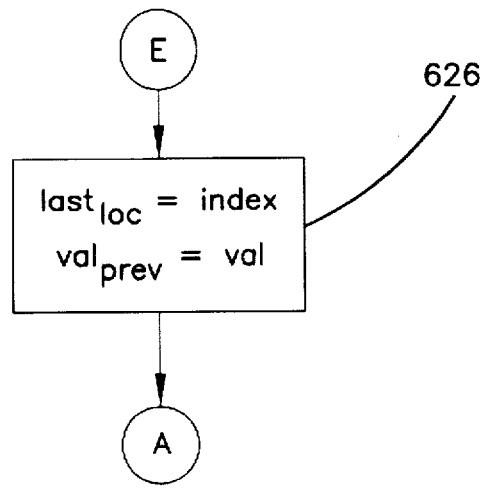

Referring now to FIG. 6E, block 626 represents setting $last_{loc}$=index and setting $val_{pres}$=val. Control then transfers to "A" in FIG. 6A to complete the loop.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any RDBMS software could benefit from the present invention.

In summary, the present invention discloses a method and apparatus for generating static, dynamic and hybrid sparse indices for workfiles used in SQL queries in a relational database management system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing a query in a computer, the query being used by the computer to direct information retrieval from a database stored in an electronic storage device connected to the computer, the method comprising the steps of:

(a) creating a workfile and a sparse index structure in the computer, wherein the workfile contains sorted rows for an inner table referenced in the query, the sparse index structure comprises a static portion and a dynamic portion, and the creating step comprises the steps of: (1) sorting the rows of the inner table to create a sorted list of rows, (2) merging the sorted rows of the inner table to eliminate duplicate rows in the sorted list, (3) selecting one or more of the merged rows at predefined intervals in the sorted list, and (4) inserting entries corresponding to the selected rows into the static portion of the sparse index structure;

(b) retrieving one or more rows from an outer table referenced in the query;

(c) searching the sparse index structure for a closest matching entry for the retrieved row from the outer table;

(d) scanning the sorted workfile for a row matching the retrieved row from the outer table using the closest matching entry from the sparse index structure as a starting position in the workfile;

(e) updating the sparse index structure with an entry corresponding to the row from the sorted workfile matching the retrieved row from the outer table; and (f) repeating steps (b)–(e) using the updated sparse index structure.

2. The method of claim 1 above, wherein the scanning step comprises scanning the sorted workfile for a row matching the retrieved row from the outer table when the closest matching entry from the sparse index structure is not an identical match.

3. The method of claim 1 above, wherein the static portion of the sparse index structure comprises a plurality of entries, each of the entries comprises an identifying key and a record identifier, and the inserting step (4) comprises the steps of selecting the key and the record identifier from each of the selected rows and inserting the key and the record identifier into one of the entries in the static portion of the sparse index structure in an order sorted by the key.

4. The method of claim 1 above, wherein the updating step comprises updating the dynamic portion of the sparse index structure by inserting an entry corresponding to the row from the workfile matching the retrieved row from the outer table into the dynamic portion of the sparse index structure.

5. The method of claim 4 above, wherein the sparse index structure comprises a plurality of entries, each of the entries comprises a key and a record identifier, and the inserting step comprises the steps of selecting the key and the record identifier from the row from the workfile matching the retrieved row from the outer table and inserting the key and the record identifier into one of the entries in the dynamic portion of the sparse index structure in an order sorted by the key.

6. An apparatus for performing a query in a computer having a data storage device coupled thereto, the data storage device storing a database, the apparatus comprising:

(a) means, performed by the computer, for accepting the query into the computer, the query being performed by the computer to retrieve data from the database;

(b) means, performed by the computer, for creating a workfile and a sparse index structure in the computer, wherein the workfile contains sorted rows for an inner table referenced in the query, the sparse index structure comprises a static portion and a dynamic portion, and the means for creating comprises: (1) means for sorting the rows of the inner table to create a sorted list of rows, (2) means for merging the sorted rows of the inner table to eliminate duplicate rows in the sorted list, (3) means for selecting one or more of the merged rows at predefined intervals in the sorted list, and (4) means for inserting entries corresponding to the selected rows into the static portion of the sparse index structure;

(c) means, performed by the computer, for retrieving one or more rows from an outer table referenced in the query;

(d) means, performed by the computer, for searching the sparse index structure for a closest matching entry for the retrieved row from the outer table;

(e) means, performed by the computer, for scanning the sorted workfile for a row matching the retrieved row from the outer table using the closest matching entry from the sparse index structure as a starting position in the workfile; and (f) means, performed by the computer, for updating the sparse index structure with an entry corresponding to the row from the sorted workfile matching the retrieved row from the outer table.

7. The apparatus of claim 6 above, wherein the means for scanning comprises means for scanning the sorted workfile for a row matching the retrieved row from the outer table when the closest matching entry from the sparse index structure is not an identical match.

8. The apparatus of claim 6 above, wherein the static portion of the sparse index structure comprises a plurality of entries, each of the entries comprises a key and a record identifier, and the means for inserting (4) comprises means for selecting the key and the record identifier from each of the selected rows and means for inserting the key and the record identifier into one of the entries in the static portion of the sparse index structure in an order sorted by the key.

9. The apparatus of claim 6 above, wherein the means for updating comprises means for updating the dynamic portion of the sparse index structure by inserting an entry corresponding to the row from the workfile matching the retrieved row from the outer table into the dynamic portion of the sparse index structure.

10. The apparatus of claim 9 above, wherein the sparse index structure comprises a plurality of entries, each of the entries comprises a key and a record identifier, and the means for inserting comprises means for selecting the key and the record identifier from the row from the workfile matching the retrieved row from the outer table and means for inserting the key and the record identifier into one of the entries in the dynamic portion of the sparse index structure in an order sorted by the key.

11. A program storage device readable by a computer, tangibly embodying a program of instructions executable by the computer to perform method steps for performing a query in a computer, the query being performed by the computer to retrieve data from a database stored in an electronic storage device coupled to the computer, the method comprising the steps of:

(a) creating a workfile and a sparse index structure in the computer, wherein the workfile contains sorted rows for an inner table referenced in the query, the sparse index structure comprises a static portion and a dynamic portion, and the creating step comprises the steps of: (1) sorting the rows of the inner table to create a sorted list of rows, (2) merging the sorted rows of the inner table to eliminate duplicate rows in the sorted list, (3) selecting one or more of the merged rows at predefined intervals in the sorted list, and (4) inserting entries corresponding to the selected rows into the static portion of the sparse index structure;

(b) retrieving one or more rows from an outer table referenced in the query;

(c) searching the sparse index structure for a closest matching entry for the retrieved row from the outer table;

(d) scanning the sorted workfile for a row matching the retrieved row from the outer table using the closest matching entry from the sparse index structure as a starting position in the workfile;

(e) updating the sparse index structure with an entry corresponding to the row from the sorted workfile matching the retrieved row from the outer table; and (f) repeating steps (b)–(e) using the updated sparse index structure.

12. The method of claim 11 above, wherein the scanning step comprises scanning the sorted workfile for a row matching the retrieved row from the outer table when the closest matching entry from the sparse index structure is not an identical match.

13. The method of claim 11 above, wherein the static portion of the sparse index structure comprises a plurality of entries, each of the entries comprises a key and a record identifier, and the inserting step (4) comprises the steps of selecting the key and the record identifier from each of the selected rows and inserting the key and the record identifier into one of the entries in the static portion of the sparse index structure in an order sorted by the key.

14. The method of claim 11 above, wherein the updating step comprises updating the dynamic portion of the sparse index structure by inserting an entry corresponding to the row from the workfile matching the retrieved row from the outer table into the dynamic portion of the sparse index structure.

15. The method of claim 14 above, wherein the sparse index structure comprises a plurality of entries, each of the entries comprises a key and a record identifier, and the inserting step comprises the steps of selecting the key and the record identifier from the row from the workfile matching the retrieved row from the outer table and inserting the key and the record identifier into one of the entries in the dynamic portion of the sparse index structure in an order sorted by the key.

* * * * *

UNITED STATES PATENT AND TRADEMARK OFFICE
CERTIFICATE OF CORRECTION

PATENT NO. : 5,758,145

DATED : May 26, 1998

INVENTOR(S) : Gautam Bhargava et al.

It is certified that error appears in the above-identified patent and that said Letters Patent is hereby corrected as shown below:

Column 5, line 56, "RDEMS" should read --RDBMS--.

Column 6, line 33, "31G" should read --316--.

Signed and Sealed this

Fifth Day of October, 1999

Attest:

Q. TODD DICKINSON

*Attesting Officer*     *Acting Commissioner of Patents and Trademarks*